United States Patent [19]

Takeshima et al.

[11] Patent Number: 5,450,722
[45] Date of Patent: Sep. 19, 1995

[54] EXHAUST PURIFICATION DEVICE OF INTERNAL COMBUSTION ENGINE

[75] Inventors: Shinichi Takeshima, Susono; Toshiaki Tanaka, Numazu; Satoshi Iguchi, Mishima; Kenji Katoh, Sunto; Tetsuro Kihara, Susono, all of Japan

[73] Assignee: Toyota Jidosha Kabushiki Kaisha, Toyota, Japan

[21] Appl. No.: 196,144

[22] PCT Filed: Jun. 10, 1993

[86] PCT No.: PCT/JP93/00777

§ 371 Date: Feb. 14, 1994

§ 102(e) Date: Feb. 14, 1994

[87] PCT Pub. No.: WO93/25805

PCT Pub. Date: Dec. 23, 1993

[30] Foreign Application Priority Data

Jun. 12, 1992 [JP] Japan .................. 4-177666
Jun. 25, 1992 [JP] Japan .................. 4-190214

[51] Int. Cl.⁶ ........................... F01N 3/20
[52] U.S. Cl. ........................... 60/285
[58] Field of Search .............. 60/274, 285, 284, 286, 60/301

[56] References Cited

U.S. PATENT DOCUMENTS

| | | | |
|---|---|---|---|
| 5,209,061 | 5/1993 | Takeshima | 60/286 |
| 5,211,010 | 5/1993 | Hirota | 60/286 |
| 5,343,702 | 9/1994 | Miyajima | 60/285 |

FOREIGN PATENT DOCUMENTS

| | | |
|---|---|---|
| 0503882 | 3/1992 | European Pat. Off. . |
| 53-115687 | 10/1978 | Japan . |
| 60-182325 | 9/1985 | Japan . |
| 62-97630 | 5/1987 | Japan . |
| 62-106826 | 5/1987 | Japan . |
| 62-117620 | 5/1987 | Japan . |
| 1-30643 | 2/1989 | Japan . |
| 1-56816 | 12/1989 | Japan . |
| 2-149715 | 6/1990 | Japan . |
| 3-135417 | 6/1991 | Japan . |
| 3-194113 | 8/1991 | Japan . |
| 4-1617 | 1/1992 | Japan . |
| 4-141219 | 5/1992 | Japan . |

OTHER PUBLICATIONS

Masato Machida, et al.; NO Removal by Absorption into BaO-CuO Binary Oxides; 1990; pp. 1165-1166.
Masato Machida, et al.; Formation and Decomposition of $BaCuO_{2.5}$ Prepared form a Mixture of Nitrates; 1991; pp. 176-179.
Masato Machida, et al.; NO Removal by Absorption into Ba-Cu-O Binary Oxides; 1991; pp. 87-90.

*Primary Examiner*—Douglas Hart
*Attorney, Agent, or Firm*—Kenyon & Kenyon

[57] ABSTRACT

A $NO_x$ absorbent (17) is disposed in an exhaust passage of an internal combustion engine. This $NO_x$ absorbent (17) absorbs the $NO_x$ when the air-fuel ratio of the exhaust gas flowing into the $NO_x$ absorbent (17) is lean and releases the absorbed $NO_x$ when the air-fuel ratio of the exhaust gas flowing into the $NO_x$ absorbent (17) becomes rich. When making the air-fuel ratio of the exhaust gas flowing into the $NO_x$ absorbent (17) rich to release the $NO_x$ from the $NO_x$ absorbent (17), the degree of richness is made larger and the time the ratio is made rich is made shorter the higher the temperature of the $NO_x$ absorbent (17).

21 Claims, 11 Drawing Sheets

RICH ← STOICHIOMETRIC → LEAN
AIR-FUEL RATIO

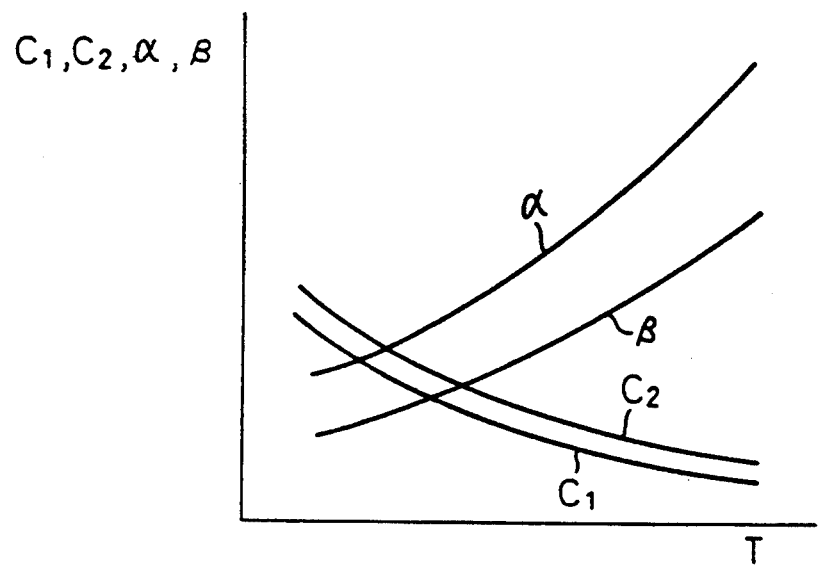

EXHAUST PURIFICATION DEVICE OF INTERNAL COMBUSTION ENGINE

TECHNICAL FIELD

The present invention relates to an exhaust purification device of an internal combustion engine.

BACKGROUND ART

A diesel engine in which an engine exhaust passage is branched to a pair of exhaust branch passages for purifying $NO_x$ in the diesel engine, a switching valve is disposed at the branched portion of these exhaust branch passages, the switching valve is switched each time a predetermined time passes to alternately guide the exhaust gas to one of the exhaust branch passages, and a catalyst which can oxidize and absorb the $NO_x$ is disposed in each of the exhaust branch passages is well known (refer to Japanese Unexamined Patent Publication No. 62-106826). In this diesel engine, the $NO_x$ in the exhaust gas introduced into one exhaust branch passage is oxidized and absorbed by the catalyst disposed in that exhaust branch passage. During this time, the inflow of the exhaust gas to the other exhaust branch passage is stopped and, at the same time, a gaseous reducing agent is fed into this exhaust branch passage. The $NO_x$ accumulated in the catalyst disposed in this exhaust branch passage is reduced by this reducing agent. Subsequently, after the elapse of a predetermined time, the introduction of the exhaust gas to the exhaust branch passage to which the exhaust gas had been introduced heretofore is stopped by the switching function of the switching valve, and the introduction of the exhaust gas to the exhaust branch passage to which the introduction of the exhaust gas had been stopped heretofore is started again. That is, in this diesel engine, seen from the viewpoint of each of the exhaust branch passages, exhaust gas is made to flow for a predetermined time during which the $NO_x$ in the exhaust gas is oxidized and absorbed by the catalyst, then the inflow of exhaust gas is stopped for a predetermined period and a reducing agent is fed, whereby the $NO_x$ accumulated in the catalyst is reduced.

However, in this diesel engine, when the $NO_x$ was to be reduced, there was the problem that the inflow of the exhaust gas to the catalyst was stopped, but that the $NO_x$ was attempted to be reduced while causing exhaust gas to flow into the catalyst. That is, with such a catalyst, the speed of reduction of the $NO_x$ changed depending on the temperature of the catalyst and as the temperature of the catalyst became lower, the speed of reduction of the $NO_x$ became slower. Accordingly, where the temperature of the catalyst is low, if a reducing agent is fed for a predetermined period, when the period of feeding the reducing agent is short, the $NO_x$ absorbed in the catalyst cannot be sufficiently reduced, so a large amount of $NO_x$ remains in the catalyst and therefore the $NO_x$ absorption capacity ends up being reduced. As a result, there was the problem that the $NO_x$ absorption capacity becomes saturated in a short time after the feeding of the reducing agent is stopped and the $NO_x$ absorption action started and therefore the $NO_x$ is released into the atmosphere.

Further, if a large amount of the reducing agent is fed when the temperature of the catalyst is low, only a small amount of the reducing agent is used for the reduction of the $NO_x$ due to the slow speed of reduction of the $NO_x$, therefore there was the problem that a large amount of the reducing agent is released in the atmosphere. On the other hand, if the amount of the reducing agent is reduced to solve this problem, then even when the temperature of the catalyst is high and therefore the speed of reduction of $NO_x$ is fast, only part of the $NO_x$ is reduced and therefore a large amount of $NO_x$ remains in the catalyst, so the $NO_x$ absorption capacity ends up reduced. As a result, there is the problem that the $NO_x$ absorption capacity ends up saturated in a short time after the feeding of the reducing agent is stopped and the $NO_x$ absorption action is started and therefore the $NO_x$ is released into the atmosphere.

DISCLOSURE OF THE INVENTION

An object of the present invention is to provide an exhaust purification device which suppresses the release of harmful components into the atmosphere at the time of reducing $NO_x$.

According to the present invention, there is provided an exhaust purification device of an internal combustion engine which has in an engine exhaust passage a $NO_x$ absorbent which absorbs the $NO_x$ when the air-fuel ratio of the inflowing exhaust gas is lean and which releases the absorbed $NO_x$ when the air-fuel ratio of the inflowing exhaust gas becomes rich and which is provided with a temperature detecting means for detecting a temperature representing the temperature of the $NO_x$ absorbent and a $NO_x$ release controlling means for making the air-fuel ratio of the exhaust gas flowing into the $NO_x$ absorbent rich when the $NO_x$ is to be released from the $NO_x$ absorbent and at that time increasing the degree of richness and or for shortening the time for which the air-fuel ratio of the exhaust gas flowing into the $NO_x$ absorbent is made rich as the temperature of the $NO_x$ absorbent increases.

BRIEF DESCRIPTION OF THE DRAWINGS

FIG. 10 is a graph showing $C_1$, $C_2$, $\alpha$, and $\beta$; FIG. 11 is a diagram showing a map of the exhaust gas temperature T.

BEST MODE FOR CARRYING OUT THE INVENTION

Figure 1:
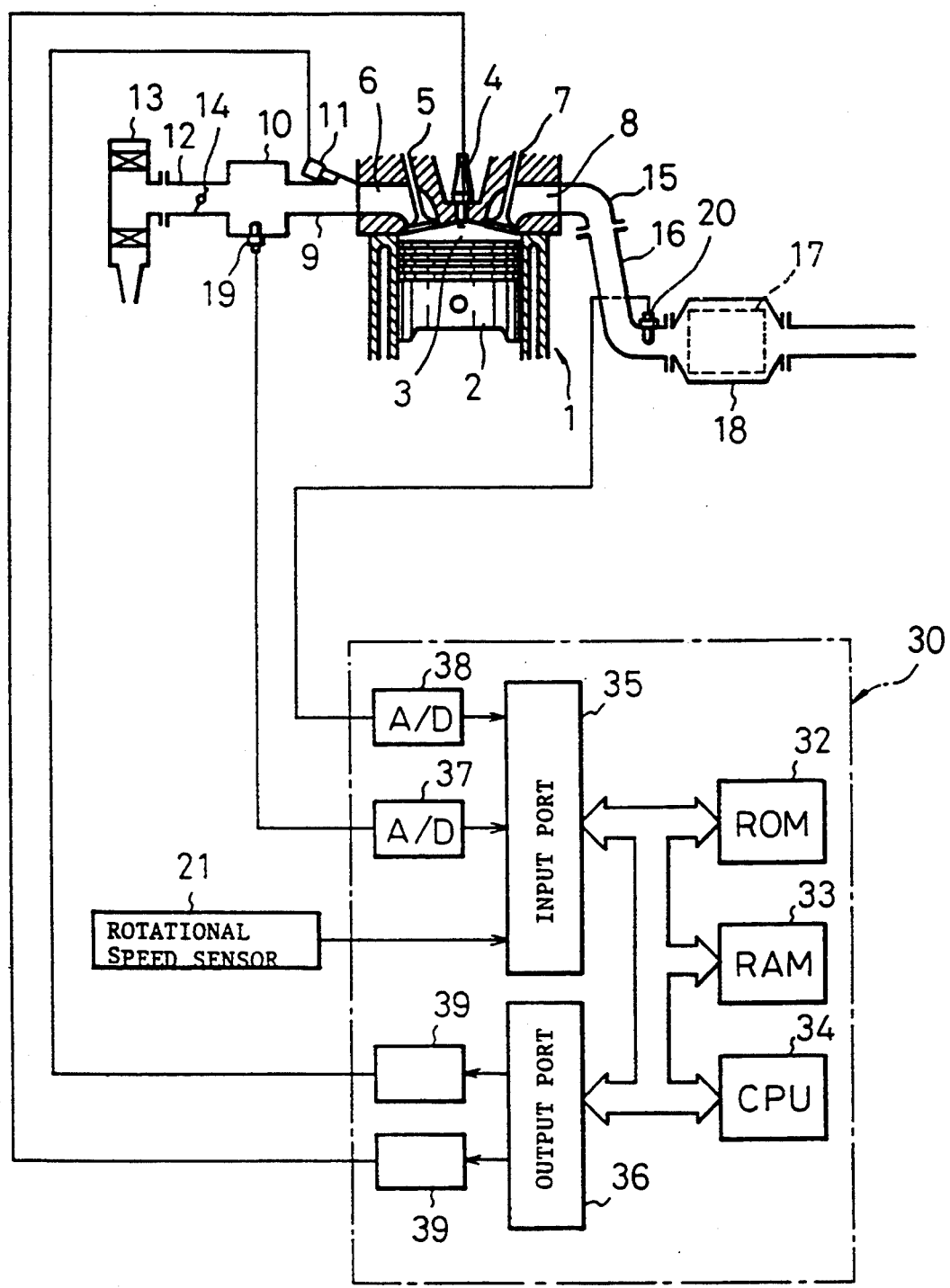
FIG. 1 is an overall view of an internal combustion engine.

FIG. 1 shows a case where the present invention is applied to a gasoline engine.

Referring to FIG. 1, 1 denotes an engine body; 2, a piston; 3, a combustion chamber; 4, a spark plug; 5, an intake valve; 6, an intake port; 7, an exhaust valve; and 8, an exhaust port, respectively. The intake port 6 is connected to a surge tank 10 via a corresponding branch pipe 9, and a fuel injector 11 injecting the fuel toward the interior of the intake port 6 is attached to each branch pipe 9. The surge tank 10 is connected to an air cleaner 13 via an intake duct 12, and a throttle valve 14 is disposed in the intake duct 12. On the other hand, the exhaust port 8 is connected via an exhaust manifold 15 and an exhaust pipe 16 to a casing 18 including a $NO_x$ absorbent 17.

An electronic control unit 30 comprises a digital computer and is provided with a ROM (read only memory) 32, a RAM (random access memory) 33, a CPU (microprocessor) 34, an input port 35, and an output port 36, which are interconnected by a bidirectional bus 31. In the surge tank 10 is mounted a pressure sensor 19 for generating an output voltage proportional to the absolute pressure in the surge tank 10. The output voltage of this pressure sensor 19 is input through an AD converter 37 to the input port 35. Further, a temperature sensor 20 which generates an output voltage proportional to the temperature of the exhaust gas is attached in the exhaust pipe 16 upstream of the casing 18. The output voltage of this temperature sensor 20 is input through an AD converter 38 to the input port 35. Further, the input port 35 is connected to a rotational speed sensor 21 for generating an output pulse expressing the engine rotational speed. On the other hand, the output port 36 is connected through a corresponding drive circuit 39 to a spark plug 4 and fuel injector 11.

Figure 2:
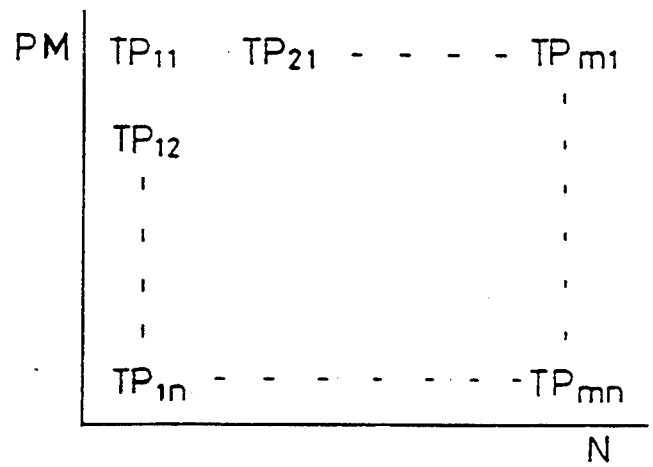
FIG. 2 is a diagram showing a map of a basic fuel injection time.

In the internal combustion engine shown in FIG. 1, the fuel injection time TAU is calculated based on for example the following equation.

$$TAU = TP \cdot K$$

where, TP is a basic fuel injection time, and K is a correction coefficient. The basic fuel injection time TP shows the fuel injection time necessary for bringing the air-fuel ratio of an air-fuel mixture fed into the engine cylinder to the stoichiometric air-fuel ratio. This basic fuel injection time TP is found in advance by experiments and is stored in advance in the ROM 32 in the form of a map as shown in FIG. 2 as the function of the absolute pressure PM in the surge tank 10 and the engine rotational speed N. The correction coefficient K is a coefficient for controlling the air-fuel ratio of the air-fuel mixture fed into the engine cylinder, and if K=1.0, the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and when K becomes larger than 1.0, the air-fuel ratio of the air-fuel mixture fed into the engine cylinder becomes smaller than the stoichiometric air-fuel ratio, that is, becomes rich.

Figure 3:
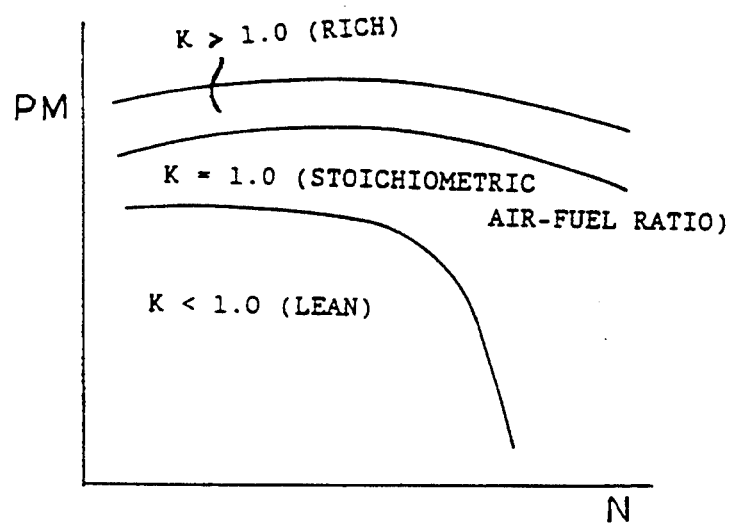
FIG. 3 is a diagram showing a correction coefficient K.

The value of this correction coefficient K is predetermined in relation to the absolute pressure PM in the surge tank 10 and the engine rotational speed N. FIG. 3 shows an embodiment of the value of the correction coefficient K. In the embodiment shown in FIG. 3, in the region where the absolute pressure PM in the surge tank 10 is relatively low, that is, in the engine low and medium load operation region, the value of the correction coefficient K is made a value smaller than 1.0, therefore at this time the air-fuel ratio of the air-fuel mixture fed into the engine cylinder is made lean. On the other hand, in the region where the absolute pressure PM in the surge tank 10 is relatively high, that is, in the engine high load operation region, the value of the correction coefficient is made 1.0. Accordingly, at this time, the air-fuel ratio of the air-fuel mixture fed into the engine cylinder is made the stoichiometric air-fuel ratio. Further, in the region where the absolute pressure PM in the surge tank 10 becomes the highest, that is, in the engine full load operation region, the value of the correction coefficient is made a value larger than 1.0. Therefore, at this time, the air-fuel ratio of the air-fuel mixture fed into the engine cylinder is made rich. An internal combustion engine is usually operated most frequently with a low and medium load and therefore for the majority of the period of operation a lean air-fuel mixture is burned.

Figure 4:
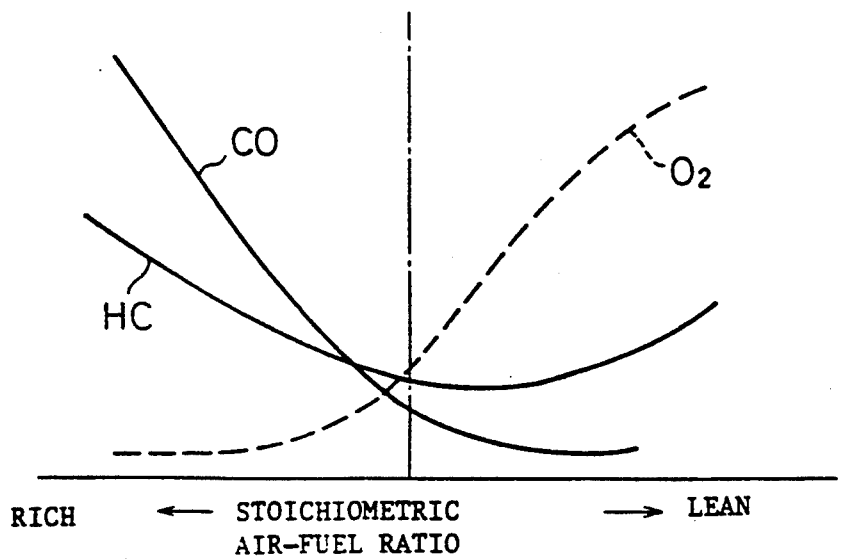
FIG. 4 is a graph schematically showing the concentration of unburnt HC, CO, and oxygen in the exhaust gas discharged from the engine.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 17 contained in the casing 18 uses, for example, alumina as a carrier. On this carrier, at least one substance selected from alkali metals, for example, potassium K, sodium Na, lithium Li, and cesium Cs; alkali earths, for example, barium Ba and calcium Ca; and rare earths, for example, lanthanum La and yttrium Y and a precious metal such as platinum Pt are carried. When referring to the ratio between the air and fuel (hydrocarbons) fed into the intake passage of the engine and the exhaust passage upstream of the $NO_x$ absorbent 17 as the air-fuel ratio of the inflowing exhaust gas flowing into the $NO_x$ absorbent 17, this $NO_x$ absorbent 17 performs the absorption and releasing function of $NO_x$ by absorbing the $NO_x$ when the air-fuel ratio of the inflowing exhaust gas is lean, while releasing the absorbed $NO_x$ when the concentration of oxygen in the inflowing exhaust gas falls. Note that, where the fuel (hydrocarbons) or air is not fed into the exhaust passage upstream of the $NO_x$ absorbent 17, the air-fuel ratio of the inflowing exhaust gas coincides with the air-fuel ratio of the air-fuel mixture fed into the combustion chamber 3, and accordingly in this case, the $NO_x$ absorbent 17 absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

When the above-mentioned $NO_x$ absorbent 17 is disposed in the exhaust passage of the engine, this $NO_x$ absorbent 17 actually performs the absorption and releasing function of $NO_x$, but there are areas of the exact mechanism of this absorption and releasing function which are not clear. However, it can be considered that this absorption and releasing function is conducted by the mechanism as shown in FIG. 5. This mechanism will be explained by using as an example a case where platinum Pt and barium Ba are carried on the carrier, but a similar mechanism is obtained even if another precious metal, alkali metal, alkali earth, or rare earth is used.

Figure 5A:
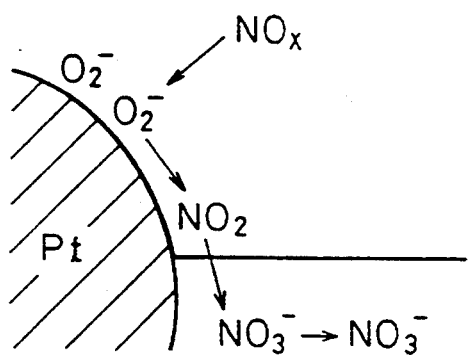
FIG. 5 is a diagram for explaining an absorption and release function of the $NO_x$.

Namely, when the inflowing exhaust gas becomes considerably lean, the concentration of oxygen in the inflowing exhaust gas is greatly increased. As shown in FIG. 5(A), the oxygen $O_2$ is deposited on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 5(A). In this way, $NO_x$ is absorbed into the $NO_x$ absorbent 17.

So long as the oxygen concentration in the inflowing exhaust gas is high, the $NO_2$ is produced on the surface of the platinum Pt, and so long as the $NO_x$ absorption ability of the absorbent is not saturated, the $NO_2$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in an inverse direction ($NO_3^- \rightarrow NO_2$), and thus nitric acid ions $NO_3^-$ in the absorbent are released in the form of $NO_2$ from the absorbent. Namely, when the oxygen concentration in the inflowing exhaust gas is lowered, the $NO_x$ is released from the $NO_x$ absorbent 17. As shown in FIG. 4, when the degree of leanness of the inflowing exhaust gas becomes low, the oxygen concentration in the inflowing exhaust gas is lowered, and accordingly when the degree of leanness of the inflowing exhaust gas is lowered, the $NO_x$ is released from the $NO_x$ absorbent 17 even if the air-fuel ratio of the inflowing exhaust gas is lean.

Figure 5B:
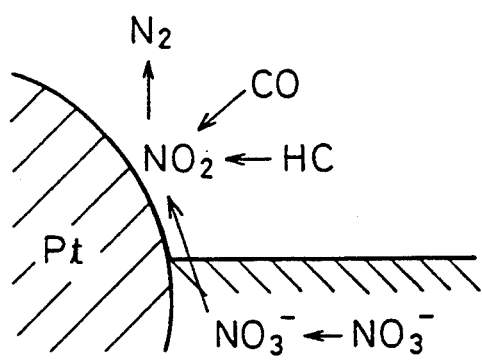

On the other hand, at this time, when the air-fuel ratio of the air-fuel mixture fed into the combustion chamber 3 is made rich and the air-fuel ratio of the inflowing exhaust gas becomes rich, as shown in FIG. 4, a large amount of unburnt HC and CO is discharged from the engine, and these unburnt HC and CO react with the oxygen $O_2^-$ or $O^{2-}$ on the platinum Pt and are oxidized. Also, when the air-fuel ratio of the inflowing exhaust gas becomes rich, the oxygen concentration in the inflowing exhaust gas is extremely lowered, and therefore the $NO_2$ is discharged from the absorbent. This $NO_2$ reacts with the unburnt HC and CO as shown in FIG. 5(B) and is reduced. In this way, when the $NO_2$ no longer exists on the surface of the platinum Pt, the $NO_2$ is successively released from the absorbent. Accordingly, when the air-fuel ratio of the inflowing exhaust gas is made rich, the $NO_x$ is released from the $NO_x$ absorbent 19 in a short time.

Namely, when the air-fuel ratio of the inflowing exhaust gas is made rich, first of all, the unburnt HC and CO immediately react with the $O_2^-$ or $O^{2-}$ on the platinum Pt and are oxidized, and subsequently if the unburnt HC and CO still remain even though the $O_2^-$ or $O^{2-}$ on the platinum Pt is consumed, the $NO_x$ released from the absorbent and the $NO_x$ discharged from the engine are reduced by these unburnt HC and CO. Accordingly, when the air-fuel ratio of the inflowing exhaust gas is made rich, the $NO_x$ absorbed in the $NO_x$ absorbent 17 is released in a short time and in addition this released $NO_x$ is reduced, and therefore the discharge of $NO_x$ into the atmosphere can be blocked. Also, since the $NO_x$ absorbent 17 has the function of a reduction catalyst, even if the air-fuel ratio of the inflowing exhaust gas is made the stoichiometric air-fuel ratio, the $NO_x$ released from the $NO_x$ absorbent 17 can be reduced. However, where the air-fuel ratio of the inflowing exhaust gas is made the stoichiometric air-fuel ratio, the $NO_x$ is released merely gradually from the $NO_x$ absorbent 17, and therefore a slightly long time is required for releasing all $NO_x$ absorbed in the $NO_x$ absorbent 17.

When the degree of leanness of the inflowing exhaust gas is lowered as mentioned before, even if the air-fuel ratio of the inflowing exhaust gas is lean, the $NO_x$ is released from the $NO_x$ absorbent 17. Accordingly, so as to release the $NO_x$ from the $NO_x$ absorbent 17, it is satisfactory if the concentration of oxygen in the inflowing exhaust gas is lowered. Note, even if the $NO_x$ is released from the $NO_x$ absorbent 17, when the air-fuel ratio of the inflowing exhaust gas is lean, the $NO_x$ is not reduced in the $NO_x$ absorbent 17, and accordingly, in this case, it is necessary to provide a catalyst which can reduce the $NO_x$ downstream of the $NO_x$ absorbent 17 or supply a reducing agent downstream of the $NO_x$ absorbent 17. Of course, it is also possible to reduce the $NO_x$ downstream of the $NO_x$ absorbent 17 in this way, but it is rather preferable that the $NO_x$ be reduced in the $NO_x$ absorbent 17. Accordingly, in the embodiment according to the present invention, when the $NO_x$ should be released from the $NO_x$ absorbent 17, the air-fuel ratio of the inflowing exhaust gas is made rich, whereby the $NO_x$ released from the $NO_x$ absorbent 17 is reduced in the $NO_x$ absorbent 17.

However, in the embodiment according to the present invention, as mentioned above, during full load operation, the air-fuel mixture fed into the engine cylinder 3 is made rich and during high load operation, the air-fuel mixture is made the stoichiometric air-fuel ratio, so during the full load operation and the high load operation, the $NO_x$ is released from the $NO_x$ absorbent 17. However, if the frequency of this full load operation or high load operation is small, then even if the $NO_x$ is released from the $NO_x$ absorbent 17 only during full load operation and high load operation, the absorption capacity of the $NO_x$ by the $NO_x$ absorbent 17 will end up becoming saturated during the time when a lean air-fuel mixture is burnt and therefore it will end up becoming impossible for the $NO_x$ absorbent 17 to absorb the $NO_x$. Accordingly, in the embodiment according to the present invention, when a lean air-fuel mixture continues to be burnt, the air-fuel mixture fed into the combustion chamber 3 is cyclically made rich and during this time the $NO_x$ is released from the $NO_x$ absorbent 17.

In this case, however, if the cycle at which the air-fuel mixture fed into the engine cylinder 3 is made rich is long, then the $NO_x$ absorbing capacity of the $NO_x$ absorbent 17 will end up becoming saturated during the time the lean air-fuel mixture is being burnt and therefore the $NO_x$ can no longer be absorbed in the $NO_x$ absorbent 17, so there will be the problem that $NO_x$ will end up being released into the atmosphere. As opposed to this, even if an engine operating state where a large amount of $NO_x$ is discharged from the engine continues, if the cycle at which the air-fuel mixture is made lean is shortened so that the $NO_x$ is released from the $NO_x$ absorbent 17 before the $NO_x$ absorbing capacity of the $NO_x$ absorbent 17 becomes saturated, then this time the problem will arise of an increase of the amount of fuel consumption.

Therefore, in the present invention, the amount of $NO_x$ which is absorbed in the $NO_x$ absorbent 17 is found and the air-fuel mixture is made rich when the amount of the $NO_x$ absorbed in the $NO_x$ absorbent 17 exceeds a predetermined allowable value. If the air-fuel mixture is made rich when the amount of the $NO_x$ absorbed in the $NO_x$ absorbent 17 exceeds a predetermined allowable value, then the $NO_x$ absorbing capacity of the $NO_x$ absorbent 17 will never become saturated, so the $NO_x$ will no longer be released into the atmosphere and, further, the frequency at which the air-fuel mixture is made rich can be reduced as well, so it is possible to suppress an increase in the amount of the fuel consumption.

However, when finding the amount of $NO_x$ being absorbed in the $NO_x$ absorbent 17, it is difficult to directly find the amount of $NO_x$ being absorbed in the $NO_x$ absorbent 17. Therefore, in the embodiment according to the present invention, the amount of the $NO_x$ absorbed in the $NO_x$ absorbent 17 is estimated from the amount of $NO_x$ in the exhaust gas discharged from the engine. That is, the higher the rotational speed N of the engine, the larger the amount of exhaust gas discharged per unit time from the engine, so as the engine rotational speed N becomes higher, the amount of $NO_x$ discharged from the engine per unit time increases. Further, the higher the engine load, that is, the higher the absolute pressure PM in the surge tank 10, the greater the amount of the exhaust gas discharged from the combustion chambers 3 and further the higher the combustion temperature, so the higher the engine load, that is, the higher the absolute pressure PM in the surge tank 10, the greater the amount of $NO_x$ discharged from the engine per unit time.

Figure 6A:
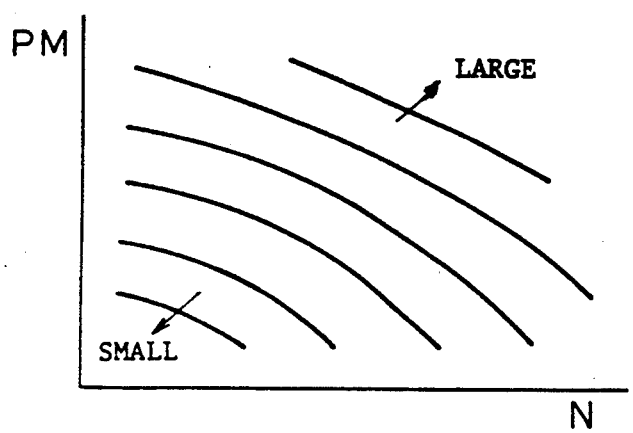
FIG. 6 is a diagram showing the amount of $NO_x$ discharged from the engine.
Figure 6B:
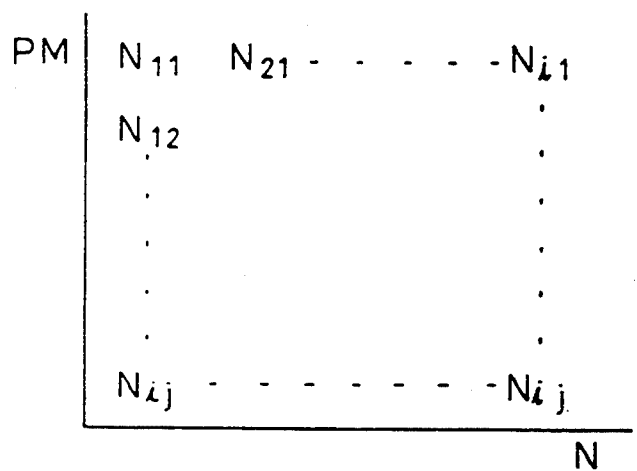

FIG. 6(A) shows the relationship between the amount of the $NO_x$ discharged from the engine per unit time, the absolute pressure PM in the surge tank 10, and the engine rotational speed N as found by experiments. In FIG. 6(A), the curves show the identical amounts of $NO_x$. As shown in FIG. 6(A), the amount of $NO_x$ discharged from the engine per unit time becomes larger the higher the absolute pressure PM in the surge tank 10 and becomes larger the higher the engine rotational speed N. Note that the amount of $NO_x$ shown in FIG. 6(A) is stored in the ROM 32 in advance in the form of a map as shown in FIG. 6(B).

Figure 7:
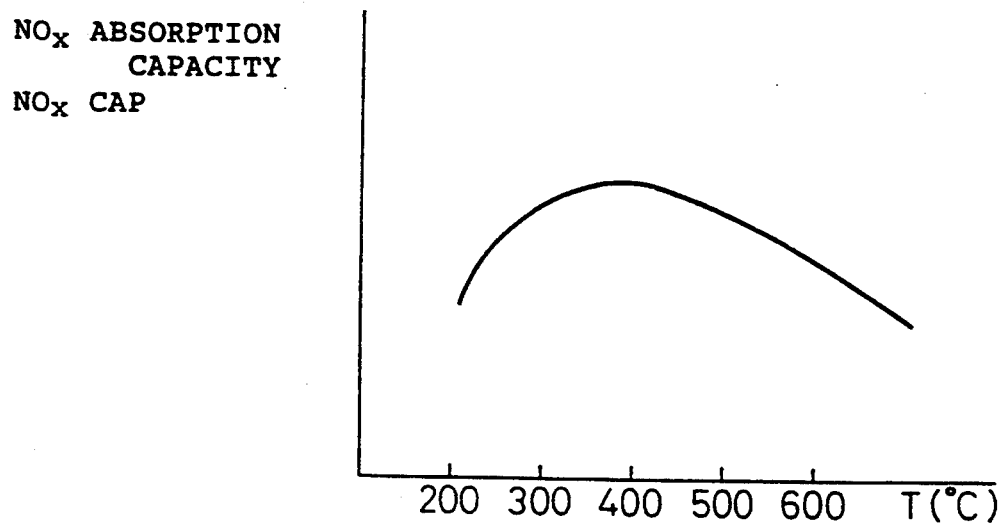
FIG. 7 is a graph showing the capacity of absorption of $NO_x$ of the $NO_x$ absorbent.

On the other hand, FIG. 7 shows the relationship between the absorption capacity $NO_xCAP$ which can be absorbed by the $NO_x$ absorbent 17 and the temperature T of the exhaust gas, which represents the temperature of the $NO_x$ absorbent 17. If the temperature of the $NO_x$ absorbent 17 becomes lower, that is, the temperature T of the exhaust gas becomes lower, the oxidation action of the $NO_x$ ($2NO+O_2 \rightarrow 2NO_2$) is weakened, and therefore the $NO_x$ absorption capacity $NO_xCAP$ is lowered. Further, if the temperature of the $NO_x$ absorbent 17 becomes higher, that is, the temperature T of the exhaust gas becomes higher, the $NO_x$ absorbed in the $NO_x$ absorbent 17 is decomposed and naturally released, so the $NO_x$ absorption capacity $NO_xCAP$ is lowered. Accordingly, the $NO_x$ absorption capacity $NO_xCAP$ becomes larger between about 300° C. to about 500° C.

Figure 8:
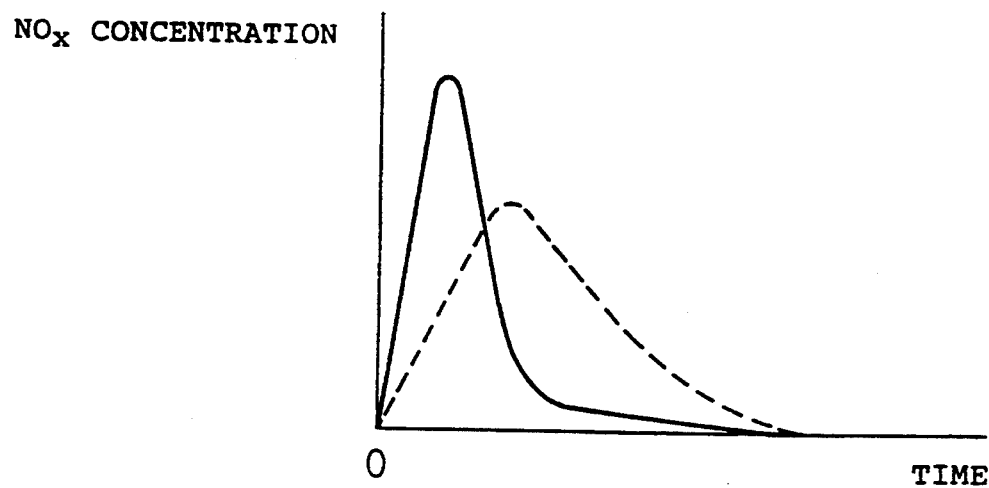
FIG. 8 is a graph showing the characteristics of release of $NO_x$.

On the other hand, FIG. 8 shows the results of experiments on the amount of $NO_x$ released from the $NO_x$ absorbent 17 when switching the air-fuel ratio of the exhaust gas flowing into the $NO_x$ absorbent 17 from lean to rich. Note that the solid line in FIG. 8 shows the state when the temperature of the $NO_x$ absorbent 17, that is, the temperature T of the exhaust gas, is high, while the broken line shows when the temperature of the $NO_x$ absorbent 17, that is, the temperature T of the exhaust gas, is low. The rate of decomposition of the $NO_x$ in the $NO_x$ absorbent 17 becomes faster the higher the temperature of the $NO_x$ absorbent 17. Therefore, when the temperature of the $NO_x$ absorbent 17 is high, as shown by the solid line in FIG. 8, that is, when the temperature T of the exhaust gas is high, a large amount of $NO_x$ is released from the $NO_x$ absorbent 17 in a short time, while when the temperature of the $NO_x$ absorbent 17, that is, the temperature T of the exhaust gas, is low, as shown by the broken line in FIG. 8, a small amount of $NO_x$ is continually released from the $NO_x$ absorbent 17 over a long period. That is, the higher the temperature T of the exhaust gas, the greater the amount of $NO_x$ released from the $NO_x$ absorbent 17 per unit time and the shorter the release time of the $NO_x$.

When the amount of the unburnt HC and CO discharged from the engine, however, is smaller than the amount which can reduce the total $NO_x$ released from the $NO_x$ absorbent 17, part of the $NO_x$ is released into the atmosphere without being reduced, while when the amount of unburnt HC and CO discharged from the engine is greater than the amount able to reduce the total $NO_x$ released from the $NO_x$ absorbent 17, the excess unburnt HC and CO are released into the atmosphere. Accordingly, to prevent the $NO_x$ and the unburnt HC and CO from being released into the atmosphere, it is necessary to discharge exactly the amount of the unburnt HC and CO from the engine needed to reduce the $NO_x$ released from the $NO_x$ absorbent 17. Toward this end, it becomes necessary to increase the amount of the unburnt HC and CO in accordance with the curve shown in FIG. 8.

Figure 9:
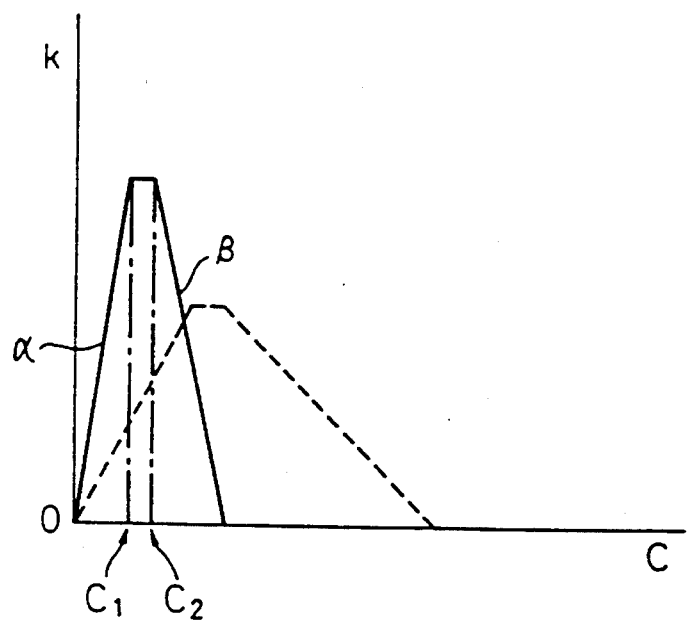
FIG. 9 is a graph showing the change in the correction coefficient K.

As mentioned earlier, however, the amount of the unburnt HC and CO discharged from the engine is proportional to the degree of richness of the air-fuel mixture fed into the combustion chamber 3. Therefore, in the present invention, as shown in FIG. 9, the value of the correction coefficient k with respect to the basic fuel injection time TP, that is, the degree of richness of the air-fuel mixture, is made to change in accordance with a pattern as close as possible to the pattern of change of the concentration of $NO_x$ shown in FIG. 8. Note that here, the correction coefficient k has the relationship $K=1+k$ with the above-mentioned correction coefficient K and therefore when $k=0$, the air-fuel mixture becomes the stoichiometric air-fuel ratio while when $k>0$, the air-fuel mixture becomes rich. Therefore, it is understood from FIG. 9 that the higher the temperature of the $NO_x$ absorbent 17, the higher the degree of richness and the shorter the time the ratio is made rich.

As shown by the solid line in FIG. 9, when the $NO_x$ is to be released from the $NO_x$ absorbent 17, the correction coefficient k is made to rise by $\alpha$ increments with each passing of the unit time until the time C reaches $C_1$. Next, when the time C is between $C_1$ and $C_2$, the correction coefficient k is held constant, then when the time C exceeds $C_2$, the correction coefficient k is made to descend in $\beta$ decrements with each unit time. The values of these $\alpha$, $\beta$, $C_1$, and $C_2$ are set so that the pattern of change of the correction coefficient k becomes as close as possible to the pattern of change of the concentration of $NO_x$ shown by the solid line in FIG. 8.

On the other hand, the pattern of change of the correction coefficient k when the temperature of the $NO_x$ absorbent 17, that is, the temperature T of the exhaust gas, is low, is also set so that it becomes as close as possible to the pattern of change of the concentration of $NO_x$ when the temperature T of the exhaust gas is low, as shown by the broken line in FIG. 8. In this case, to make the pattern of change of the correction coefficient k in FIG. 9 like the broken line, it is understood that it is sufficient to make both $\alpha$ and $\beta$ smaller and make $C_1$ and $C_2$ larger. That is, to make the pattern of change of the correction coefficient k close to the pattern of change of the concentration of $NO_x$ shown in FIG. 8, it is sufficient to make $\alpha$ and $\beta$ larger and make $C_1$ and $C_2$ smaller as the temperature T of the exhaust gas becomes higher, as shown in FIG. 10. Note that the relationship between $C_1$, $C_2$, $\alpha$, and $\beta$ and the temperature T of the exhaust gas shown in FIG. 10 is stored in advance in the ROM 32.

Note that in the embodiment according to the present invention, provision is made of a temperature sensor 25 for detecting the temperature T of the exhaust gas and accordingly the $NO_x$ absorption capacity $NO_x$ CAP shown in FIG. 7 and the $\alpha$, $\beta$, $C_1$, and $C_2$ shown in FIG. 10 are determined based on the temperature T of the exhaust gas detected by this temperature sensor 25. The temperature T of the exhaust gas, however, can be estimated from the absolute pressure PM in the surge tank 10 and the engine rotational speed N. Therefore, instead of providing the temperature sensor 25, it is possible to store the temperature T of the exhaust gas in the ROM 32 in advance in the form of a map as shown in FIG. 11 and determine the $NO_x$ absorption capacity $NO_x$ CAP and $\alpha$, $\beta$, $C_1$, and $C_2$ based on the temperature T of the exhaust gas obtained from this map.

Next, an explanation will be made of the first embodiment of control of the release of $NO_x$ with reference to FIG. 12 to FIG. 14.

Figure 12:
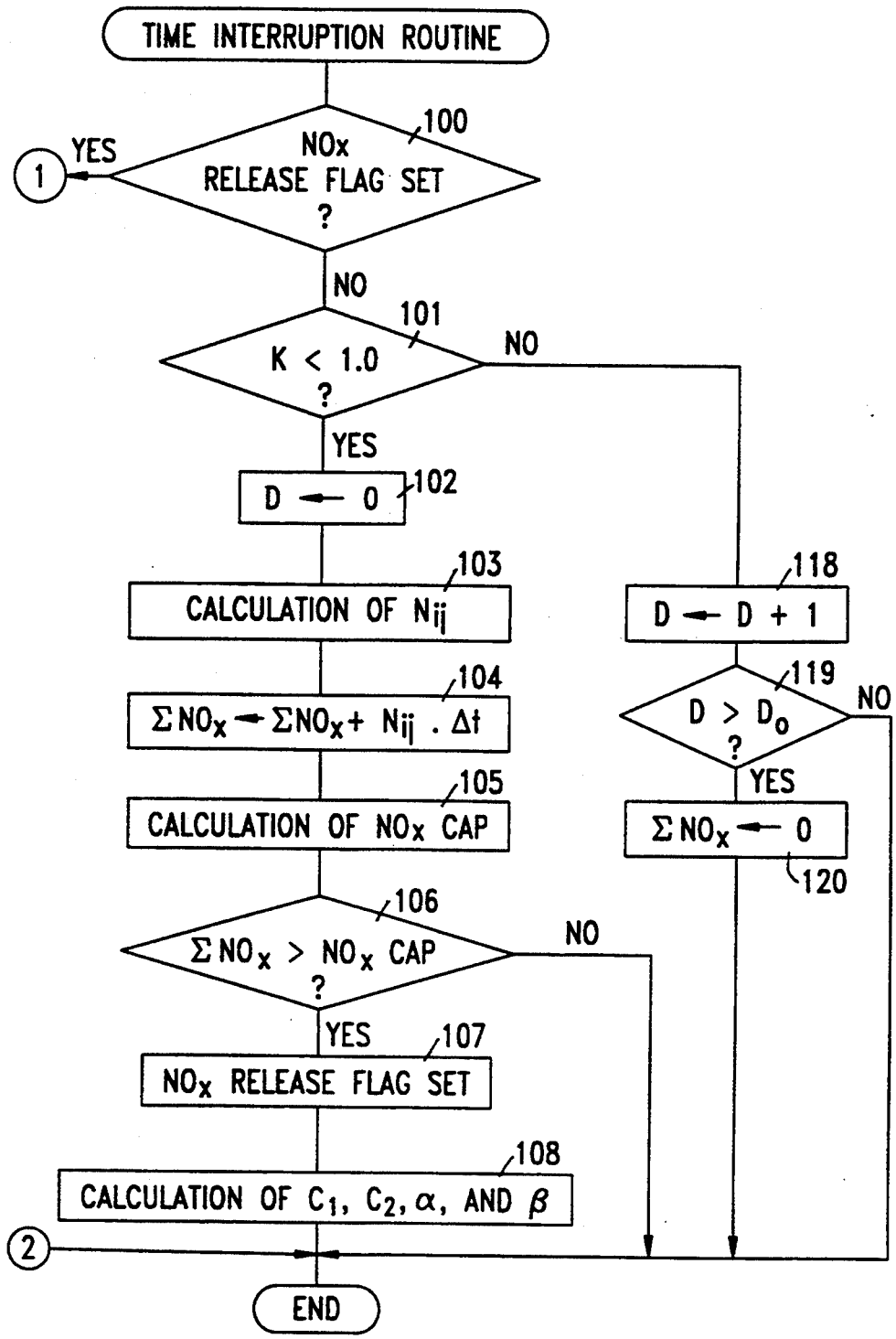
FIG. 12 and FIG. 13 are flow charts showing a time interruption routine.
Figure 13:
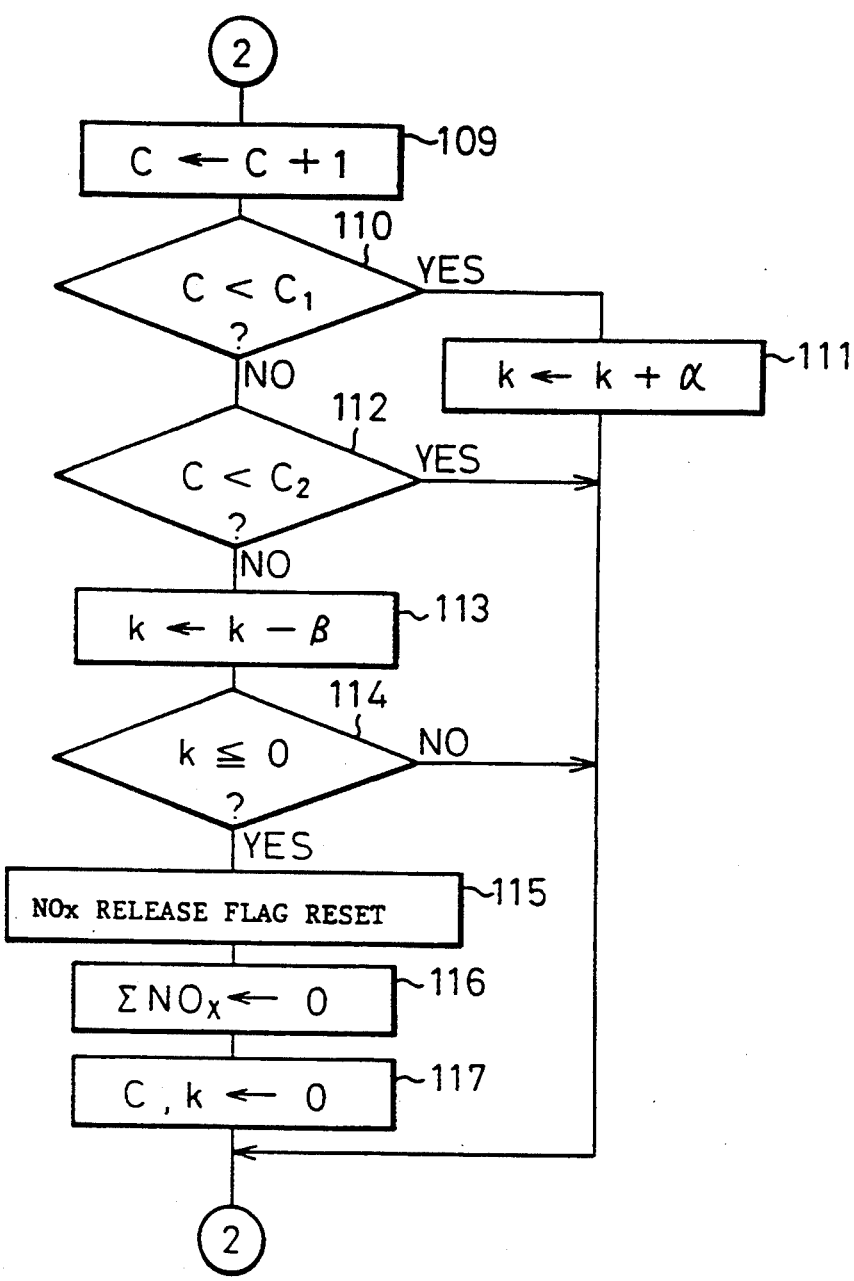

FIG. 12 and FIG. 13 show a time interruption routine executed by interruption every predetermined time.

Referring to FIG. 12 and FIG. 13, first, at step 100, it is judged if a $NO_x$ release flag showing that the $NO_x$ should be released from the $NO_x$ absorbent 17 is set or not. When the $NO_x$ release flag is not set, the routine proceeds to step 101, where it is judged if the correction coefficient K is smaller than 1.0, that is, if the operating state is one in which the air-fuel mixture should be made lean. When $K<1.0$, that is, when the operating state is one in which the air-fuel mixture should be made lean, the routine proceeds to step 102, where the count D is made zero, then the routine proceeds to step 103.

At step 103, the $NO_x$ amount Nij discharged from the engine per unit time is calculated from the map shown in FIG. 6(B) based on the absolute pressure PM in the surge tank 10, detected by the pressure sensor 19, and the engine rotational speed N. Next, at step 104, the $NO_x$ amount Nij is multiplied by the interruption time interval At and the product Nij·$\Delta T$ is added to $\Sigma NO_x$. The product Nij·$\Delta t$ shows the amount of the $NO_x$ discharged from the engine during the interruption time interval $\Delta t$. At this time, the $NO_x$ discharged from the engine is absorbed by the $NO_x$ absorbent 17, so $\Sigma NO_x$ shows the estimated value of the amount of $NO_x$ absorbed in the $NO_x$ absorbent 17.

Next, at step 105, the $NO_x$ absorption capacity $NO_x$ CAP is calculated from the relationship shown in FIG. 7 based on the temperature T of the exhaust gas detected by the temperature sensor 25. Next, at step 106, it is judged if the estimated value $\Sigma NO_x$ of the amount of $NO_x$ absorbed in the $NO_x$ absorbent 17 has exceeded the $NO_x$ absorption capacity $NO_x$CAP. When $\Sigma NO_x \leq NO_x$CAP, the processing cycle is completed. At this time, a lean air-fuel mixture is burned and the $NO_x$ discharged from the engine is absorbed in the $NO_x$ absorbent 17.

On the other hand, if it is judged at step 106 that $\Sigma NO_x > NO_x$CAP, that is, the $NO_x$ absorption capacity of the $NO_x$ absorbent 17 is saturated, the routine proceeds to step 107, where the $NO_x$ release flag is set. Next, at step 108, $C_1$, $C_2$, $\alpha$, and $\beta$ are calculated from the relation shown in FIG. 10 based on the temperature T of the exhaust gas and the processing cycle is ended. If the $NO_x$ release flag is set, at the next processing cycle, the routine proceeds from step 100 to step 109, where the count C is incremented by one. Next, at step 110, it is judged if the count C is smaller than $C_1$. When $C<C_1$, the routine proceeds to step 111, where $\alpha$ is added to the correction coefficient k. Next, the processing cycle is ended. The action of addition of $\alpha$ to the correction coefficient k is performed continuously until $C \geq C_1$. Accordingly, the value of the correction coefficient k during this time continues to increase as shown in FIG. 9.

On the other hand, if it is judged at step 110 that $C \geq C_1$, the routine proceeds to step 112, where it is judged if the count C has become smaller than $C_2$. When $C<C_2$, the processing cycle is ended. Therefore, as shown in FIG. 9, the correction coefficient k is held constant until $C \geq C_2$.

Next, at step 112, when it is judged that $C \geq C_2$, the routine proceeds to step 113, where $\beta$ is subtracted from the correction coefficient k. Next, at step 113, it is judged if the correction coefficient k has become zero or a negative number. When $k>0$, the processing cycle is ended. Accordingly, as shown in FIG. 9, the correction coefficient k is reduced until $k \leq 0$. Note that, as mentioned later, if $k>0$, the air-fuel mixture fed to the combustion chamber 3 is made rich and during this time the degree of richness is changed by the pattern shown in FIG. 9.

On the other hand, if it is judged at step 114 that $K \leq 0$, the routine proceeds to step 115, where the $NO_x$ release flag is reset. Next, at step 116, $\Sigma NO_x$ is made zero. That is, at this time, it is considered that all of the $NO_x$ which had been absorbed in the $NO_x$ absorbent 17 is released, so the estimated value $\Sigma NO_x$ of the $NO_x$ absorbed in the $NO_x$ absorbent 17 is made zero. Next, at step 117, the count C and the correction coefficient k are made zero and the processing cycle is ended.

On the other hand, if it is judged at step 101 that $k \geq 1.0$, that is, when the engine operating state is one in which the air-fuel mixture should be made rich or the stoichiometric air-fuel ratio, the routine proceeds to step 118, where the count D is incremented by one. Next, at step 119, it is judged if the count D has become larger than the constant value $D_0$. When $D>D_0$, the routine proceeds to step 120, where $\Sigma NO_x$ is made zero. That is, when the combustion of the rich air-fuel ratio or the stoichiometric air-fuel ratio continues for a certain time, it may be considered that all of the $NO_x$ has been released from the $NO_x$ absorbent 17, so at this time the estimated value $\Sigma NO_x$ of the amount of $NO_x$ absorbed in the $NO_x$ absorbent 17 is made zero.

Figure 14:
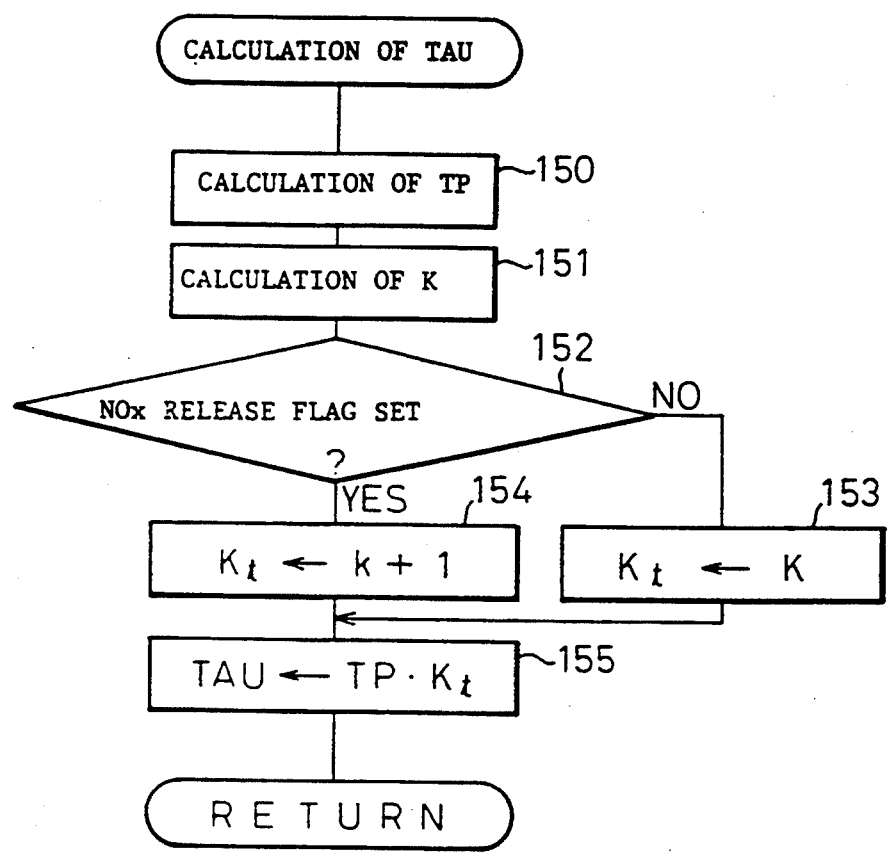
FIG. 14 is a flow chart for calculating the fuel injection time TAU.

FIG. 14 shows the routine for calculation of the fuel injection time TAU. This routine is repeatedly executed.

Referring to FIG. 14, first, at step 150, a basic fuel injection time TP is calculated from a map indicated in FIG. 2. Subsequently, at step 151, the correction coefficient K shown in FIG. 3, which is determined in accordance with the operating state of the engine, is calculated. Next, at step 152, it is judged if the $NO_x$ release flag is set or not. When the $NO_x$ release flag is not set, the routine proceeds to step 153, where the correction coefficient K is made $K_t$. Next, at step 155, $K_t$ is multiplied with the basic fuel injection time TP, whereby the fuel injection time TAU is calculated. Accordingly, at this time, the air-fuel mixture which is fed into the combustion chamber 3 is made lean, the stoichiometric air-fuel ratio, or rich in accordance with the operating state of the engine as shown in FIG. 3.

On the other hand, when it is judged at step 152 that the $NO_x$ release flag is set, the routine proceeds to step 154, where $K_t$ is made the sum $(k+1)$ of correction coefficient k calculated by the routine shown in FIG. 12 and FIG. 13 and 1, then the routine proceeds to step 155. Next, at this time, the air-fuel mixture fed to the combustion chamber 3 is made rich, then the degree of richness is changed by the pattern shown in FIG. 9.

Figure 15:
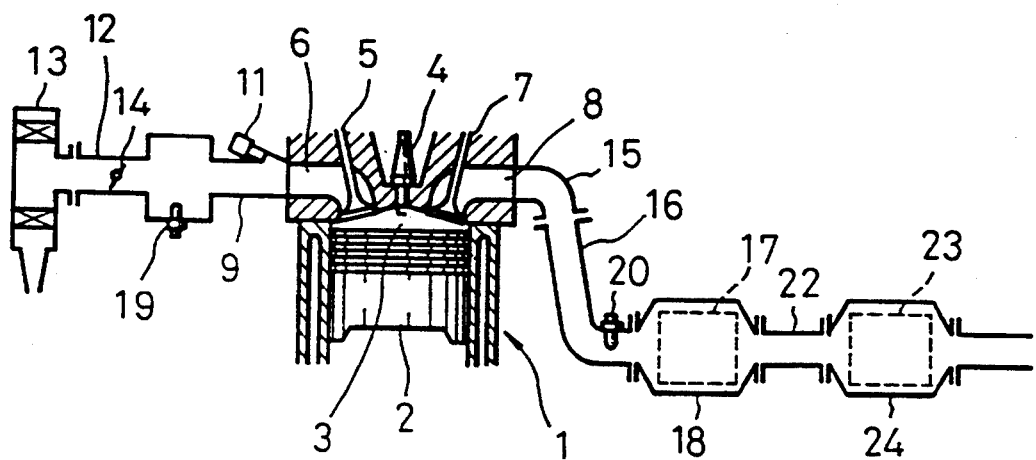
FIG. 15 is an overall view of an internal combustion engine showing another embodiment.

FIG. 15 shows another embodiment of the internal combustion engine. In this embodiment, an outlet side of a casing 18 is connected through an exhaust pipe 22 to a catalytic converter 24 housing a three-way catalyst 23. This three-way catalyst 23, as is well known, exhibits a high purification efficiency with respect to CO, HC, and $NO_x$ when the air-fuel ratio is maintained near the stoichiometric air-fuel ratio, but the three-way catalyst 23 also has a high purification efficiency with respect to $NO_x$ even when the air-fuel ratio becomes rich to a certain extent. In the embodiment shown in FIG. 15, a three-way catalyst 23 is provided downstream of the $NO_x$ absorbent 17 so as to remove the $NO_x$ using this characteristic.

That is, as is mentioned above, if the air-fuel mixture fed into the engine cylinder is made rich to release the $NO_x$ from the $NO_x$ absorbent 17, the $NO_x$ absorbed in the $NO_x$ absorbent 17 is rapidly released from the $NO_x$ absorbent 17. At this time, the $NO_x$ is reduced during its release, but there is a possibility that all of the $NO_x$ will not be reduced. If the three-way catalyst 23 is disposed downstream of the $NO_x$ absorbent 17, however, the $NO_x$ which could not be reduced at the time of the release of the $NO_x$ is reduced by the three-way catalyst 23. Accordingly, by disposing the three-way catalyst 23 downstream of the $NO_x$ absorbent 17, it becomes possible to improve considerably the purification performance of the $NO_x$.

In the embodiments discussed up to here, use was made, as the $NO_x$ absorbent, of a $NO_x$ absorbent 17 comprised of at least one of an alkali metal, alkali earth, and rare earth and a precious metal carried on alumina. Instead of using such a $NO_x$ absorbent 17, however, it is also possible to use a complex oxide of an alkali earth and copper, that is, a $NO_x$ absorbent of the Ba—Cu—O system. As such a complex oxide of an alkali earth and copper, use may be made for example of $MnO_2$-$BaCuO_2$. In this case, it is also possible to add platinum Pt or cerium Ce. In a $NO_x$ absorbent of the $MnO_2$-$BaCuO_2$ system, the copper Cu performs the same catalytic function as the platinum Pt in the $NO_x$ absorbent 17 spoken of up to now. When the air-fuel ratio is lean, the $NO_x$ is oxidized by the copper $(2NO+O_2 \rightarrow 2NO_2)$ and dispersed in the absorbent in the form of nitric acid ions $NO_3^-$.

On the other hand, if the air-fuel ratio is rich, similarly, $NO_x$ is released from the absorbent. This $NO_x$ is reduced by the catalytic action of the copper Cu. The $NO_x$ reducing ability of copper Cu, however, is weaker than the $NO_x$ reducing ability of platinum Pt and therefore when using an absorbent of the Ba—Cu—O system, the amount of $NO_x$ which is not reduced at the time of release of the $NO_x$ becomes somewhat greater than with the $NO_x$ absorbent 17 discussed up to now. Therefore, when using an absorbent of the Ba—Cu—O system, as shown in FIG. 21, it is preferable to dispose a three-way catalyst 23 downstream of the absorbent.

We claim:

1. An exhaust purification device of an internal combustion engine comprising:

an engine exhaust passage;

an $NO_x$ absorbent disposed within the engine exhaust passage, wherein the $NO_x$ absorbent absorbs $NO_x$ included in exhaust gas from the engine when the air-fuel ratio of the exhaust gas flowing into the $NO_x$ absorbent is lean and wherein the $NO_x$ absorbent releases the absorbed $NO_x$ when the air-fuel ratio of the exhaust gas flowing into the $NO_x$ absorbent becomes rich;

temperature detecting means for detecting a temperature representing the temperature of the $NO_x$ absorbent; and $NO_x$ release controlling means for making the air-fuel ratio of the exhaust gas flowing into the $NO_x$ absorbent a predetermined rich air-fuel ratio for a predetermined period of time when the $NO_x$ is to be released from the $NO_x$ absorbent and wherein the $NO_x$ release controlling means determines one of the predetermined rich air-fuel ratio and the predetermined period of time based on the temperature of the $NO_x$ absorbent, so that, when the $NO_x$ release controlling means determines the predetermined rich air-fuel ratio based on the temperature of the $NO_x$ absorbent, the predetermined rich air-fuel ratio is made richer as the temperature of the $NO_x$ absorbent increases and, when the $NO_x$ release controlling means determines the predetermined period of time based on the temperature of the $NO_x$ absorbent, the predetermined period of time is shortened as the temperature of the $NO_x$ absorbent increases.

2. An exhaust purification device of an internal combustion engine according to claim 1, wherein said $NO_x$ release controlling means determines both the predetermined rich air-fuel ratio and the predetermined period of time based on the temperature of the $NO_x$ absorbent and so that the predetermined rich air-fuel ratio is made richer and the predetermined time is shortened as the temperature of the $NO_x$ absorbent increases.

3. An exhaust purification device of an internal combustion engine according to claim 2, further comprising means for determining an amount of $NO_x$ released from the $NO_x$ absorbent, wherein said $NO_x$ release controlling means changes the predetermined rich air-fuel ratio so that a pattern of change of the predetermined rich air-fuel ratio resembles a pattern of change of the amount of $NO_x$ released from the $NO_x$ absorbent when $NO_x$ is released from the $NO_x$ absorbent.

4. An exhaust purification device of an internal combustion engine according to claim 3, wherein, when $NO_x$ is to be released from the $NO_x$ absorbent, said $NO_x$ release controlling means increases the richness of the predetermined rich air-fuel ratio to a first value by a predetermined rate of rise and then reduces the richness of the predetermined rich air-fuel ratio by a predetermined rate of reduction and wherein the $NO_x$ release controlling means increases the rate of rise, the first value, and the rate of reduction as the temperature of the $NO_x$ absorbent increases.

5. An exhaust purification device of an internal combustion engine according to claim 1, wherein the temperature representing the $NO_x$ absorbent is the temperature of the exhaust gas flowing into the $NO_x$ absorbent.

6. An exhaust purification device of an internal combustion engine according to claim 5, further comprising a memory in which the temperature of the exhaust gas flowing into the $NO_x$ absorbent is stored as a function of the engine load and the engine rotational speed and wherein the temperature of the $NO_x$ absorbent is also stored in the memory.

7. An exhaust purification device of an internal combustion engine according to claim 1, wherein said $NO_x$ release controlling means makes the air-fuel ratio of the air-fuel mixture fed into the combustion chamber rich when releasing $NO_x$ from the $NO_x$ absorbent.

8. An exhaust purification device of an internal combustion engine according to claim 1, wherein $NO_x$ estimating means is provided for estimating the amount of $NO_x$ absorbed in said $NO_x$ absorbent and wherein the $NO_x$ release controlling means makes the air-fuel ratio of the exhaust gas flowing into the $NO_x$ absorbent rich to release the $NO_x$ from the $NO_x$ absorbent when the amount of $NO_x$ estimated to be absorbed in the $NO_x$ absorbent by the $NO_x$ estimating means exceeds a predetermined allowance.

9. An exhaust purification device of an internal combustion engine according to claim 8, further comprising means for determining an amount of $NO_x$ discharged from the combustion chamber to the engine exhaust passage, wherein said $NO_x$ estimating means estimates the amount of $NO_x$ absorbed in the $NO_x$ absorbent on the basis of the amount of $NO_x$ discharged from the combustion chamber to the engine exhaust passage.

10. An exhaust purification device of an internal combustion engine according to claim 9, further comprising means for determining an engine load and an engine rotational speed, wherein said $NO_x$ estimating means is comprised of an $NO_x$ calculating means for calculating the amount of $NO_x$ discharged per unit time from the engine to the engine exhaust passage in accordance with the engine load and the engine rotational speed and a cumulative adding means for cumulatively adding the amounts of $NO_x$ calculated by the $NO_x$ calculating means.

11. An exhaust purification device of an internal combustion engine according to claim 10, wherein said $NO_x$ calculating means is provided with a memory in which is previously stored the amount of $NO_x$ discharged per unit time from the engine to the engine exhaust passage as a function of the engine load and the engine rotational speed and wherein the cumulative adding means cumulatively adds the amounts of $NO_x$ stored in the memory and determined from the engine load and the engine rotational speed.

12. An exhaust purification device of an internal combustion engine according to claim 10, further comprising a throttle valve disposed in the engine intake passage for controlling the engine load and means for determining the magnitude of a vacuum inside the engine intake passage downstream of the throttle valve, wherein the means for determining the engine load determines the engine load based on the magnitude of the vacuum inside the engine intake passage downstream of the throttle valve.

13. An exhaust purification device of an internal combustion engine according to claim 8, wherein said allowance is the maximum $NO_x$ absorption capacity of the $NO_x$ absorbent.

14. An exhaust purification device of an internal combustion engine according to claim 13, wherein said allowance is a function of the temperature representing the temperature of the $NO_x$ absorbent.

15. An exhaust purification device of an internal combustion engine according to claim 8, wherein said $NO_x$ estimating means makes the amount of $NO_x$ estimated to be absorbed in the $NO_x$ absorbent zero when the air-fuel ratio of the exhaust gas flowing into the $NO_x$ absorbent is made rich due to the amount of $NO_x$ estimated by the $NO_x$ estimating means exceeding the allowance.

16. An exhaust purification device of an internal combustion engine according to claim 8, wherein air-fuel ratio control means is provided for making the air-fuel ratio of the air-fuel mixture fed to the combustion chamber rich in accordance with the operating state of the engine regardless of whether the amount of $NO_x$ estimated by the $NO_x$ estimating means exceeds the allowance.

17. An exhaust purification device of an internal combustion engine according to claim 16, wherein said air-fuel ratio control means makes the air-fuel ratio of the air-fuel mixture fed into the combustion chamber rich when the engine load is higher than a predetermined load.

18. An exhaust purification device of an internal combustion engine according to claim 17, wherein said $NO_x$ estimating means makes the amount of $NO_x$ estimated as being absorbed in the $NO_x$ absorbent zero when the air-fuel ratio of the air-fuel mixture is made rich for more than a predetermined time.

19. An exhaust purification device of an internal combustion engine according to claim 1, wherein the $NO_x$ absorbent includes at least one substance selected from alkali metals such as potassium, sodium, lithium, and cesium, alkali earths such as barium and calcium, and rare earths such as lanthanum and yttrium and platinum.

20. An exhaust purification device of an internal combustion engine according to claim 1, wherein the $NO_x$ absorbent is comprised of a compound oxide of barium and copper.

21. An exhaust purification device of an internal combustion engine according to claim 1, wherein a three-way catalyst is disposed in the engine exhaust passage downstream of the $NO_x$ absorbent.

* * * * *

UNITED STATES PATENT AND TRADEMARK OFFICE
CERTIFICATE OF CORRECTION

PATENT NO. : 5,450,722
DATED : September 19, 1995
INVENTOR(S) : Shinichi TAKESHIMA et al.

It is certified that error appears in the above-indentified patent and that said Letters Patent is hereby corrected as shown below:

| Column | Line | |
|---|---|---|
| 5 | 48 | Change "absorbent 19" to --absorbent 17--. |
| 7 | 48 | Change "$NO_x(2NO+O_2--2NO_2)$" to --"$NO_x(2NO+O_2 \rightarrow 2NO_2)$"--. |
| 9 | 51 | Change "At" to --$\Delta$t--. |

Signed and Sealed this

Twenty-third Day of April, 1996

Attest:

BRUCE LEHMAN

Attesting Officer          Commissioner of Patents and Trademarks